Oct. 9, 1928.

R. T. PIERCE 1,686,639

ELECTRICAL MEASURING INSTRUMENT

Filed May 12, 1923

WITNESSES:
F. H. Miller
S. H. Welker

INVENTOR
Raymond T. Pierce.
BY
Wesley G. Carr
ATTORNEY

Patented Oct. 9, 1928.

1,686,639

UNITED STATES PATENT OFFICE.

RAYMOND T. PIERCE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed May 12, 1923. Serial No. 638,625.

My invention relates to electrical measuring instruments and particularly to the movable elements thereof.

One object of my invention is to provide a device of the above indicated character that shall permit a desirable scale adjustment.

Another object of my invention is to provide an electrical measuring instrument in which the assembly of the movable element shall be facilitated.

Another object of my invention is to provide an improved terminal means for the movable coil of an electrical measuring instrument.

A further object of my invention is to provide an electrical measuring instrument that shall be simple and durable in construction, economical to manufacture and effective in its operation.

Heretofore, in the construction of a certain type of indicating instrument, it has been usual to provide parts so designed that when assembled, the pointer and scale have a certain relation. That is, in the production of large numbers of such instruments, the pointers and shafts, while varying somewhat in their positions relative to the scales in the several instruments, are adapted to assume approximately the same relative positions in all of the instruments. This construction, while not objectionable in certain cases, is undesirable in others.

In instruments of the type to which my invention relates, such as alternating-current frequency or power factor meters, it is desirable that a simple and effective adjustment be permitted in order that the individual instruments may be set up accurately during or after assembly and particularly during test or calibration.

Accordingly, in practicing my invention, I provide an instrument in which a simple and effective means is provided for adjusting the movable coil relative to the shaft by which it is carried. This means permits the coil to be easily released, readjusted and locked in its new position at any time.

Figure 1:
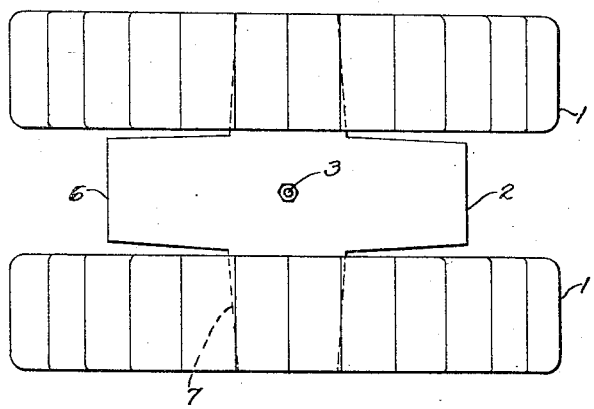
Figure 2:
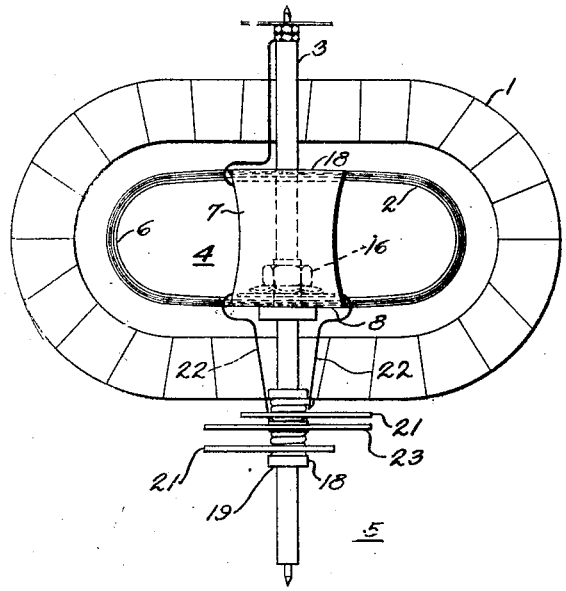

Figure 1 of the accompanying drawings is a plan view of a portion of an electrical measuring instrument constructed in accordance with my invention, showing the relation of the stationary and movable coils, Fig. 2 is a side elevational view of the device shown in Fig. 1.

Figure 3:
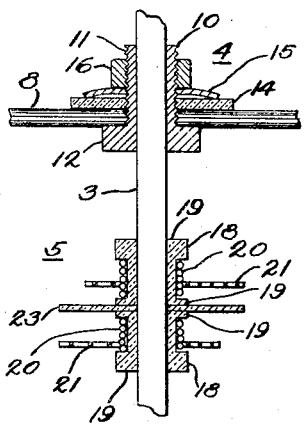
Figure 4:
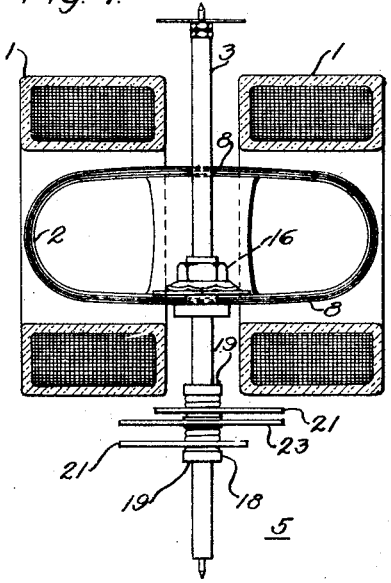

Fig. 3 is an enlarged detailed sectional view of a portion of the device as viewed in Fig. 2, and Fig. 4 is a view, partially in section and partially in elevation, taken at right angles to Fig. 2.

The device of my invention comprises, in general, a pair of stationary coils 1, a movable coil 2, a shaft 3, a combination adjusting and attaching device 4, for securing the coil 2 to the shaft 3, and a terminal device 5, for the coil 2.

The coils 1 are of a usual type, preferably of oval shape, disposed in spaced parallelism on either side of the shaft 3, and so arranged that the coil 2, moves into the openings therein.

The coil 2 preferably comprises two substantially oval shaped portions 6 and 7 at right angles to each other having common mid portions 8, through which the shaft 3 extends.

The device 4, as shown more clearly in Fig. 3, comprises a bushing 10, preferably press fitted on the shaft 3, having a screw-threaded portion 11 and an enlarged head portion 12. One of the portions 8 of the coil 2 is provided with an opening which permits it to be placed over the portion 11 of the bushing 10 to a position against the head 12, in which position it is held by an insulating washer 14, a lock washer 15 and a nut 16.

If it is desired to adjust the angular movement of the shaft 3 and thereby the position of the pointer relatively to the scale, not shown, it is only necessary to release the nut 16 and to turn the coil 2 to the desired new position relative to the shaft 3, after which the nut 16 is again turned against the lock washer 15 to lock the coil 2 in adjusted position. By this adjustment, different effects on the shaft, such as different degrees of movement thereof, may be obtained for the same relative degrees of energization of the coils 1 and 2.

The terminal device 5 comprises preferably a pair of insulating spools or sleeves 18 surrounding the shaft 3 and each having laterally projecting annular flanges 19 between which a conducting element 20 is helically wound to form a substantially solid cylindrical metal sleeve. This construction economizes the construction of the device and facilitates its assembly. Each helical element 20 is preferably secured in position by soldering at its ends to the next adjacent turn thereof.

Flexible conducting leads 21, spirally wound about the elements 20, are each secured, at one end to one of the elements 20 and, at the other end, to a stationary member (not shown). The circuit of the coil 2 is completed by leads 22, as shown in Fig. 2, which are also soldered to the elements 20.

A protective insulating shield 23 comprising a relatively thin disk of relatively great diameter compared to the sleeve 19, is disposed around the shaft 3 between the sleeves 18 and between the leads 21.

The above described construction facilitates the assembly and adjustment of the element to a high degree and provides a simple, effective and economical terminal means for the movable coil 2.

While I have shown and described a particular form of my invention, changes may be effected therein without departing from the spirit and scope thereof, as set forth in the appended claims.

I claim as my invention:

1. An electrical measuring instrument, comprising a coil, a single shaft extending substantially normal to the magnetic axis, and through opposite sides thereof, means constituting a laterally extending shoulder on the shaft against which only one side of the coil rests and means longitudinally movable on the shaft for clamping said side against said shoulder.

2. An electrical measuring instrument comprising a coil, a single shaft extending substantially normal to the magnetic axis, and through opposite sides thereof, means constituting a laterally extending shoulder on the shaft against which only one side of the coil rests, means longitudinally movable on the shaft for clamping said side against said shoulder and means for locking said clamping means in clamped position.

3. An electrical measuring instrument comprising a coil having openings through opposite sides, and substantially normal to the magnetic axis thereof, a shaft extending through said openings, a bushing having a screw-threaded portion extending through one of said openings only and an enlarged portion constituting a shoulder against which the coil rests, and a nut on the bushing for clamping the coil against said shoulder.

4. In an electrical measuring instrument, the combination with a shaft, a coil mounted thereon and a flexible conducting lead, of terminal means between the coil and the flexible lead comprising an insulating member surrounding and carried by the shaft, and a tubular conducting element surrounding the insulating member comprising an elongated filamentary conductor wound helically about the insulating member and having its convolutions fixed relative to each other.

5. In an electrical measuring instrument, the combination with a shaft, a coil mounted thereon and a flexible conducting lead, of terminal means between the coil and the flexible lead comprising a cylindrical insulating member having longitudinally-spaced, laterally-extending annular flanges surrounding and carried by the shaft, and a cylindrical conducting element surrounding the insulating member between said flanges comprising an elongated filamentary conductor wound helically about the insulating member and having its convolutions fixed relative to each other.

6. In an electrical measuring instrument, the combination with a shaft and a coil mounted thereon, of terminal means for the coil comprising a pair of insulating sleeves on the shaft, each having longitudinally spaced laterally extending flanges, a helically-wound conducting sleeve surrounding each insulating sleeve between said flanges, a flexible conducting lead connected at one end to, and wound spirally around, each conducting sleeve and a relatively thin laterally-projecting insulating disk surrounding the shaft between said flexible leads.

7. In combination, a shaft, a bushing secured on said shaft, an elliptical coil disposed about said shaft, said shaft passing through substantially the mid-section of the sides of said coil, and a nut for securing one of the sides of said coil to said bushing.

8. In combination, a shaft, a bushing secured on said shaft, an elliptical coil disposed about said shaft, said shaft passing through substantially the mid-section of the sides of said coil, and a nut and resilient washer for securing one of the sides of said coil to said bushing.

9. The combination with a shaft and a coil disposed about said shaft, said shaft passing through substantially the mid-section of said coil, of means for adjustably mounting said coil on said shaft comprising a member rigidly secured to said shaft and threaded clamping means cooperatively engaging said member and said coil for retaining said coil in a predetermined position.

10. The combination with an elliptical coil, and a shaft passing through and terminating at each end exteriorly of said coil, of adjustable means co-acting with said shaft for non-rotatably securing said coil thereto, said adjustable means in one position permitting movement of said coil circumferentially of said shaft.

11. The combination with a unitary structure comprising a plurality of elliptical coils disposed substantially at right angles and having their major axes disposed substantially in the same plane, and a shaft passing through and terminating at each end exteriorly of said structure, of adjustable means co-acting with said shaft for non-rotatably securing said structure thereto, said adjustable means in one position permitting movement of said structure circumferentially of said shaft.

In testimony whereof, I have hereunto subscribed my name, this 9th day of May, 1923.

RAYMOND T. PIERCE.